US008306141B2

(12) United States Patent
Castelain et al.

(10) Patent No.: US 8,306,141 B2
(45) Date of Patent: Nov. 6, 2012

(54) METHOD AND A DEVICE FOR DETERMINING SHIFTING PARAMETERS TO BE USED BY AT LEAST A FIRST AND A SECOND TELECOMMUNICATION DEVICES

(75) Inventors: Damien Castelain, Rennes Cedex 7 (FR); David Mottier, Rennes Cedex 7 (FR); Cristina Ciochina, Rennes Cedex 7 (FR)

(73) Assignee: Mitsubishi Electric Corporation, Tokyo (JP)

( * ) Notice: Subject to any disclaimer, the term of this patent is extended or adjusted under 35 U.S.C. 154(b) by 402 days.

(21) Appl. No.: 12/633,225

(22) Filed: Dec. 8, 2009

(65) Prior Publication Data
US 2010/0150259 A1 Jun. 17, 2010

(30) Foreign Application Priority Data

Dec. 15, 2008 (EP) .................... 08171643

(51) Int. Cl.
*H04B 7/02* (2006.01)
(52) U.S. Cl. ...................................... 375/267
(58) Field of Classification Search .................. 375/267
See application file for complete search history.

(56) References Cited

U.S. PATENT DOCUMENTS

| 2011/0235562 | A1* | 9/2011 | Tong et al. ............ 370/312 |
| 2011/0243109 | A1* | 10/2011 | Cheng et al. ........... 370/336 |
| 2012/0002623 | A1* | 1/2012 | Khandekar et al. ......... 370/329 |

FOREIGN PATENT DOCUMENTS

| EP | 1 959 603 A1 | 8/2008 |
| WO | WO 2008/098670 A1 | 8/2008 |
| WO | WO 2008/137994 A1 | 11/2008 |

OTHER PUBLICATIONS

Cristina Ciochina, et al., "A Novel Space-Frequency Coding Scheme for Single Carrier Modulations," The 18th Annual IEEE International Symposium on Personal, Indoor and Mobile Radio Communications, XP031168487, Sep. 2007, 5 pages.
Cristina Ciochina, et al., "A Novel Quasi-Orthogonal Space-Frequency Block Code for Single-Carrier FDMA," Vehicular Technology Conference, XP031255705, May 2008, pp. 1137-1141.
Wei Zhang, et al, "Space-Time/Frequency Coding for MIMO-OFDM in Next Generation Broadband Wireless Systems," IEEE Wireless Communications, XP011189164, Jun. 2007, pp. 32-43.
Yi Hong, et al., Algebraic Multiuser Space-Frequency Block Codes, Spread Spectrum Techniques and Applications, ISSSTA, XP031319031, Aug. 2008, pp. 329-333.
Wei Zhang, et al, "A Systematic Design of Multiuser Space-Frequency Codes for MIMO-OFDM Systems," Communications, XP031125812, Jun. 2007, pp. 1054-1058.
U.S. Appl. No. 13/255,698, filed Sep. 9, 2011, Castelain, et al.

* cited by examiner

*Primary Examiner* — Don N Vo
(74) *Attorney, Agent, or Firm* — Oblon, Spivak, McClelland, Maier & Neustadt, L.L.P.

(57) ABSTRACT

A method for determining shifting parameters $p_1$ and $p_2$ to be used by a first and a second telecommunication devices for mapping symbols on sub-carriers. The method comprises the steps of:
  allocating to the first and the second telecommunication device sub-carriers, at least a part of the sub-carriers allocated to the first telecommunication device being allocated to the second telecommunication device,
  determining the shifting parameter $p_2$, the shifting parameter $p_2$ being even and at least equal to the number of overlapping sub-carriers allocated to both the first and the second telecommunication devices or the shifting parameter $p_2$ being even and at most equal to $M_2$ minus the number of overlapping sub-carriers allocated to both the first and the second telecommunication devices.

12 Claims, 10 Drawing Sheets

| | Ant11 | Ant12 |
|---|---|---|
| 100 | X0 | -X3* |
| 101 | X1 | X2* |
| 102 | X2 | -X1* |
| 103 | X3 | X0* |
| 104 | X4 | -X7* |
| 105 | X5 | X6* |
| 106 | X6 | -X5* |
| 107 | X7 | X4* |

Fig. 1a

| | Ant21 | Ant22 |
|---|---|---|
| 120 | Y0 | -Y5* |
| 121 | Y1 | Y4* |
| 122 | Y2 | -Y3* |
| 123 | Y3 | Y2* |
| 124 | Y4 | -Y1* |
| 125 | Y5 | Y0* |
| 126 | Y6 | -Y11* |
| 127 | Y7 | Y10* |
| 128 | Y8 | -Y9* |
| 129 | Y9 | Y8* |
| 130 | Y10 | -Y7* |
| 131 | Y11 | Y6* |

Fig. 1b

| | Carrier |
|---|---|
| 150 | 0 |
| 151 | 1 |
| 152 | 2 |
| 153 | 3 |
| 154 | 4 |
| 155 | 5 |
| 156 | 6 |
| 157 | 7 |
| 158 | 8 |
| 159 | 9 |
| 160 | 10 |
| 161 | 11 |

| | |
|---|---|
| X0 | -X3* |
| X1 | X2* |
| X2 | -X1* |
| X3 | X0* |
| X4 | -X7* |
| X5 | X6* |
| X6 | -X5* |
| X7 | X4* |

| | |
|---|---|
| Y0 | -Y5* |
| Y1 | Y4* |
| Y2 | -Y3* |
| Y3 | Y2* |
| Y4 | -Y1* |
| Y5 | Y0* |
| Y6 | -Y11* |
| Y7 | Y10* |
| Y8 | -Y9* |
| Y9 | Y8* |
| Y10 | -Y7* |
| Y11 | Y6* |

Fig. 1c

| Carrier |
|---|
| 0 |
| 1 |
| 2 |
| 3 |
| 4 |
| 5 |
| 6 |
| 7 |
| 8 |
| 9 |
| 10 |
| 11 |
| 12 |
| 13 |
| 14 |
| 15 |

900 — 0
901 — 1
902 — 2
903 — 3
904 — 4
905 — 5
906 — 6
907 — 7
908 — 8
909 — 9
910 — 10
911 — 11
912 — 12
913 — 13
914 — 14
915 — 15

| X0 | -X7* |
|---|---|
| X1 | X6* |
| X2 | -X5* |
| X3 | X4* |
| X4 | -X3* |
| X5 | X2* |
| X6 | -X1* |
| X7 | X0* |
| Z0 | -Z3* |
| Z1 | Z2* |
| Z2 | -Z1* |
| Z3 | Z0* |
| Z4 | -Z7* |
| Z5 | Z6* |
| Z6 | -Z5* |
| Z7 | Z4* |

| Y0 | -Y7* |
|---|---|
| Y1 | Y6* |
| Y2 | -Y5* |
| Y3 | Y4* |
| Y4 | -Y3* |
| Y5 | Y2* |
| Y6 | -Y1* |
| Y7 | Y0* |
| Y8 | -Y11* |
| Y9 | Y10* |
| Y10 | -Y9* |
| Y11 | Y8* |
| T0 | -T3* |
| T1 | T2* |
| T2 | -T1* |
| T3 | T0* |

Fig. 9

| Carrier |
|---|
| 0 |
| 1 |
| 2 |
| 3 |
| 4 |
| 5 |
| 6 |
| 7 |
| 8 |
| 9 |
| 10 |
| 11 |

1100, 1101, 1102, 1103, 1104, 1105, 1106, 1107, 1108, 1109, 1110, 1111

| | |
|---|---|
| X0 | -X3* |
| X1 | X2* |
| X2 | -X1* |
| X3 | X0* |

| | |
|---|---|
| Y0 | -Y5* |
| Y1 | Y4* |
| Y2 | -Y3* |
| Y3 | Y2* |
| Y4 | -Y1* |
| Y5 | Y0* |
| Y6 | -Y11* |
| Y7 | Y10* |
| Y8 | -Y9* |
| Y9 | Y8* |
| Y10 | -Y7* |
| Y11 | Y6* |

Fig. 11

METHOD AND A DEVICE FOR DETERMINING SHIFTING PARAMETERS TO BE USED BY AT LEAST A FIRST AND A SECOND TELECOMMUNICATION DEVICES

BACKGROUND OF THE INVENTION

The present invention relates generally to a method and a device for determining shifting parameters to be used by at least a first and a second telecommunication devices for transferring symbols.

More precisely, the present invention is in the field of coding and decoding schemes used in the context of MIMO (Multiple Input Multiple Output) communications especially used in conjunction of OFDM or OFDMA-like transmission schemes.

Orthogonal Frequency-Division Multiplexing (OFDM) is based upon the principle of frequency-division multiplexing (FDM) and is implemented as a digital modulation scheme. The bit stream to be transmitted is split into several parallel bit streams, typically dozens to thousands. The available frequency spectrum is divided into several sub-channels, and each low-rate bit stream is transmitted over one sub-channel by modulating a sub-carrier using a standard modulation scheme, for example PSK, QAM, etc. The sub-carrier frequencies are chosen so that the modulated data streams are orthogonal to each other, meaning that cross talk between the sub-channels is eliminated.

The primary advantage of OFDM is its ability to cope with severe channel conditions, for example, multipath and narrowband interference, without complex equalization filters. Channel equalization is simplified by using many slowly modulated narrowband signals instead of one rapidly modulated wideband signal.

A variation called DFT spread OFDM or SC-FDMA (Single Carrier Frequency-Division Multiple Access) has been developed. In this system each symbol to be transmitted is spread over a set of transmitted frequencies by a DFT (Discrete Fourier Transform), the resulting signal is sent over a conventional OFDMA transmission system.

Actual implementation of coding/decoding are made either in the frequency domain or in the time domain while the implementation in the frequency domain may be preferred.

It is known that the use of several antennas both at the emitter and the receiver, leading to MIMO systems allows the improvement of the robustness of the transmission. This improved robustness can be used to increase the range or the bandwidth by adjusting the classical range versus bandwidth tradeoff. Several types of diversity schemes could be used to take advantage of multiple antennas at the emitter.

Alamouti has developed an Orthogonal Space Time Block Code (OSTBC) wherein information to be transmitted are spread in space, by the different antennas, and in time, using different time slots. The reference paper regarding Alamouti codes is "A simple transmit diversity technique for wireless communications", *IEEE J. Select. Areas Commun.*, vol. 16, pp. 1451-1458, October 1998. In a first implementation of Alamouti code, two transmit antennas (FirstAnt and SecondAnt) are used for transferring two symbols a and b in two time slots (T1 and T2). At time T1 antenna FirstAnt transmits symbol a when antenna SecondAnt transmits symbol b. At time T2 antenna FirstAnt transmits symbol −b* when antenna SecondAnt transmits symbol a*, where "*" denotes the complex conjugate. This Alamouti code, let us call it classical Alamouti in time, has the advantage to offer simple coding and decoding, the increased diversity leading to better performance. It is to be noted that the throughput is not increased.

The optimal MAP for Maximum A Posteriori decoding is very simple, it does not imply matrix inversion, log enumeration or sphere decoding as long as the channel does not vary between T1 and T2 and as long as the channel can be characterized by a simple multiplication. It is naturally well combined with OFDM or OFDM-like modulation schemes.

A second implementation of Alamouti code called OSFBC for Orthogonal Space Frequency Block Code is based on transmission of the data over two different frequencies (F1 and F2), and not over two different time slots. With two transmit antennas (FirstAnt and SecondAnt), two symbols a and b are respectively sent on two frequencies (F1 and F2) using an antenna FirstAnt transmits symbol a when antenna SecondAnt transmits symbol b. Through the antenna FirstAnt, the symbol −b* is sent on the frequency F1 and the symbol a* is sent on the frequency F2 through the antenna SecondAnt.

The two frequencies are adjacent, to limit the variations of the channel.

By definition, this scheme is applied to OFDMA or OFDMA-like modulation schemes. By OFDMA-like modulations, we denote for example some frequency-domain implementation of a single carrier scheme, in which preferably, but not strictly necessarily, a cyclic prefix has been added, like for example the described DFT-spread OFDM. Compared to OSTBC, the advantage is the use of only one modulation slot, which can be advantageous from the multiplexing point of view, and may lead to better performance in case of very fast variations of the channel like high Doppler. Alamouti codes, due to their simple implementation and good performance are very attractive schemes to be used in MIMO transmission. When applied to SC-FDMA like modulation schemes, these codes do not have the valuable feature to produce signals with the low variation envelope property for each antenna, the envelope being the modulus of the complex envelope.

In the published patent invention WO 2008/098672, it has been proposed a method of radio data emission, by an emitter comprising at least two transmit antennas. The signal transmitted on a first antenna being considered in the frequency domain as resulting from a DFT of size M leading to the emission of a symbol on each of the M sub carriers allocated to the emitter on the first antenna. A SC(p) relation is defined by $S_k^{SecondAnt}=(-1)^{k+1}S^*_{(p-1-k) \mod M}$ for k=0 to M−1 giving the signal to be emitted on a second antenna SecondAnt from the signal S to be emitted on the first antennaFirstAnt, where p is an even shifting parameter between 0 and M−1 and k is the index of each used sub carrier in the frequency domain.

The use of above mentioned technique is not adapted into systems wherein plural devices like mobile stations use different bandwidths for data transmission which overlap each other.

The FIG. 1a shows an example wherein a first emitter comprises two transmit antennas Ant11 and Ant12. The signal transmitted on the antenna Ant 11 being considered in the frequency domain as resulting from a DFT of size M=8 leading to the emission of a symbol on each of the M sub carriers on the antenna Ant 11. The SC(p) relation, with p=4, defined by $X^{tAnt12}_k=(-1)^{k+1}*_{(p-1-k) \mod M}$ for k=0 to M−1 gives the signal to be emitted on the antenna Ant12 from the signal X to be emitted on the antenna Ant11.

The FIG. 1b shows an example wherein a second emitter comprises two transmit antennas Ant21 and Ant22. The signal transmitted on the antenna Ant21 being considered in the frequency domain as resulting from a DFT of size M=12 leading to the emission of a symbol on each of the M sub carriers on the antenna Ant 21. The SC(p) relation, with p=6, defined by $Y'^{Ant22}{}_k=(-1)^{k+1}Y^*{}_{(p-1-k)mod\ M}$ for k=0 to M−1, gives the signal to be emitted on the antenna Ant22 from the signal Y to be emitted on the antenna Ant21.

When the first and second emitters transmit simultaneously data on frequency bands which overlap, for example when the first emitter transmits data on the frequency band composed of sub-carriers noted 1 to 8 of the FIG. 1c and the second emitter transmits data on the frequency band composed of sub-carriers noted 0 to 11, some impairment problems occur. On the sub-carrier 5, the couples of data (X4, −X7*) and (Y5, Y0*) are transferred but on the carrier 8, the couple of data (X7, X4*) is transferred and the couple (Y0, −Y5*) is not transferred on that carrier.

Such impairments lead to situation wherein the decoding of the received symbols at the receiver side is not possible.

BRIEF SUMMARY OF THE INVENTION

The present invention aims at enabling the decoding of the symbols simultaneously transmitted by plural emitters on frequency bands which overlap.

To that end, the present invention concerns a method for determining shifting parameters $p_1$ and $p_2$ to be used by a first and a second telecommunication devices for mapping symbols on sub-carriers, the first telecommunication device comprising at least two transmit antennas, the symbols being transferred through each antenna of the first telecommunication device on at least an even number '$M_1$', strictly greater than two, of used sub-carriers allocated to the first telecommunication device, the second telecommunication device comprising at least two transmit antennas, the symbols being transferred through each antenna of the second telecommunication device on an even number '$M_2$', equal or greater than $M_1$, of sub-carriers allocated to the second telecommunication device, the first telecommunication device transferring on a first antenna of the first telecommunication device during a time slot on each frequency 'k1', with k1=0 to $M_1-1$, a signal representing a symbol '$X_{k1}$' in the frequency domain, the first telecommunication device transferring on a second antenna of the first telecommunication device during the time slot, on each used frequency 'k1', with k1=0 to $M_1-1$, a signal representing a symbol '$X'_{k1}$' derived from the symbol $X_{k1}$, for each frequency k1, by the formula $X'^{secondAnt}{}_{k1}=\epsilon(-1)^{k1+1}X^*{}_{(p_1-1-k1)mod\ M_1}$, where $\epsilon$ is 1 or −1, X* means the complex conjugate of X, $p_1-1-k1$ is taken modulo $M_1$ and $p_1$ is even, the second telecommunication device transferring on a first antenna of the second telecommunication device during a given time slot on each frequency 'k2', with k2=0 to $M_2-1$, a signal representing a symbol '$Y_{k2}$' in the frequency domain, the second telecommunication device transferring on a second antenna of the second telecommunication device during the same time slot, on each frequency 'k2', with k2=0 to $M_2-1$, a signal representing a symbol '$Y'_{k2}$' derived from the symbol $Y_{k2}$, for each frequency k2, by the formula $Y'^{secondAnt}{}_{k2}=\epsilon(-1)^{k2+1}Y^*{}_{(p_2-1-k2)mod\ M_2}$ where $p_2-1-k2$ is taken modulo $M_2$ and $p_2$ even, the method comprises the steps of:

allocating to the first and the second telecommunication devices sub-carriers, at least a part of the sub-carriers allocated to the first telecommunication device being also allocated to the second telecommunication device, determining the shifting parameter $p_2$, the shifting parameter $p_2$ being even and at least equal to the number of overlapping sub-carriers allocated to both the first and the second telecommunication devices or the shifting parameter $p_2$ being even and at most equal to $M_2$ minus the number of overlapping sub-carriers allocated to both the first and the second telecommunication devices.

The present invention concerns also a device for determining shifting parameters $p_1$ and $p_2$ to be used by a first and a second telecommunication devices for mapping symbols on sub-carriers, the first telecommunication device comprising at least two transmit antennas, the symbols being transferred through each antenna of the first telecommunication device on at least an even number '$M_1$', strictly greater than two, of sub-carriers allocated to the first telecommunication device, the second telecommunication device comprising at least two transmit antennas, the symbols being transferred through each antenna of the second telecommunication device on an even number '$M_2$', equal or greater than $M_1$, of sub-carriers allocated to the second telecommunication device, the first telecommunication device transferring on a first antenna of the first telecommunication device during a time slot on each frequency 'k1', with k1=0 to $M_1-1$, a signal representing a symbol '$X_{k1}$' in the frequency domain, the first telecommunication device transferring on a second antenna of the first telecommunication device during the time slot, on each frequency 'k1', with k1=0 to $M_1-1$, a signal representing a symbol '$X'_{k1}$' derived from the symbol $X_{k1}$, for each frequency k1, by the formula $X'^{secondAnt}{}_{k1}=\epsilon(-1)^{k1+1}X^*{}_{(p_1-1-k1)mod\ M_1}$, where $\epsilon$ is 1 or −1, X* means the complex conjugate of X, $p_1-1-k1$ is taken modulo $M_1$ and p1 even, the second telecommunication device transferring on a first antenna of the second telecommunication device during a given time slot on each frequency 'k2', with k2=0 to $M_2-1$, a signal representing a symbol '$Y_{k2}$,' in the frequency domain, the second telecommunication device transferring on a second antenna of the second telecommunication device during the same time slot, on each frequency 'k2', with k2=0 to $M_2-1$, a signal representing a symbol derived from the symbol $Y_{k2}$, for each frequency k2, by the formula $Y'^{seccondAnt}{}_{k2}=\epsilon(-1)^{k2+1}Y^*{}_{(p_2-1-k2)mod\ M_2}$ where $p_2-1-k2$ is taken modulo $M_2$ and p2 even, the device for determining shifting parameters comprises:

means for allocating to the first and the second telecommunication device sub-carriers, at least a part of the sub-carriers allocated to the first telecommunication device being also allocated to the second telecommunication device, means for determining the shifting parameter $p_2$, the shifting parameter $p_2$ being even and at least equal to the number of overlapping sub-carriers allocated to both the first and the second telecommunication devices or the shifting parameter $p_2$ being even and at most equal to $M_2$ minus the number of overlapping sub-carriers allocated to both the first and the second telecommunication devices.

Thus, it is possible to decode the symbols simultaneously transmitted by plural emitters on same sub-carriers when convenient bandwidth allocation is being made.

According to a particular feature, the method comprises further step of determining the shifting parameter $p_1$, the shifting parameter $p_1$ being even and different from the shifting parameter $p_2$.

According to a particular feature, each sub-carrier allocated to the first telecommunication device is also allocated to the second telecommunication device, $M_2$ is strictly upper than $M_1$, $p_1$ is determined as equal to null value and $p_2$ is determined as equal to $M_1$.

Thus, it is possible to decode the symbols simultaneously transmitted by plural emitters on same sub-carriers.

According to a particular feature, $M_2=2M_1$ and the method comprises a further step of transferring to the second telecommunication device an information indicating that the second telecommunication device has to use a non null shifting parameter equal to $M_2$ divided by two.

Thus, the signalling is limited.

According to a particular feature, the method comprises further step of transferring to the first telecommunication device an information indicating that the first telecommunication device has to use a null shifting parameter.

Thus, the signalling is limited.

According to a particular feature, the method comprises a further step of transferring to the second telecommunication device an information indicating the value of the shifting parameter to be used by the second telecommunication device.

According to a particular feature, each sub-carrier allocated to the first telecommunication device is allocated to the second telecommunication device and the sub-carriers allocated to the second telecommunication device and not allocated to the first telecommunication device surround the sub-carriers allocated to both the first and second telecommunication devices.

Thus, the sub-carrier allocation is flexible and enable many combination of allocations to the telecommunication devices.

According to a particular feature, information representative of the sub-carriers allocated to the first and second telecommunication devices is transferred respectively to the first and second telecommunication device.

According to a particular feature, the present invention is executed by a base station and the base station:

de maps symbols on sub-carriers allocated to the first telecommunication device using the shifting parameter determined for the first telecommunication device, de maps symbols on sub-carriers allocated to the second telecommunication device using the shifting parameter determined for the second telecommunication device.

According to a particular feature, each telecommunication device maps symbols on sub-carriers allocated to the telecommunication device using the shifting parameter determined for the telecommunication device.

According to still another aspect, the present invention concerns a computer readable medium storing program instructions or portions of code for implementing the steps of the method according to the invention, when said program instructions or portions of code are executed by a programmable device.

Since the features and advantages relating to the computer program are the same as those set out above related to the method and apparatus according to the invention, they will not be repeated here.

BRIEF DESCRIPTION OF THE DRAWINGS

The characteristics of the invention will emerge more clearly from a reading of the following description of an example embodiment, the said description being produced with reference to the accompanying drawings, among which:

FIG. 1a represents an example of symbol mapping for a first mobile station wherein the number of sub carriers allocated to the first mobile station equals eight and the shifting parameter to be used by the first mobile station is equal to four;

FIG. 1b represents an example of symbol mapping for a second mobile station wherein the number of sub carriers allocated to the second mobile station equals twelve and the shifting parameter to be used by the second mobile station is equal to six;

FIG. 1c represents a mapping of symbols of first and second mobile stations on sub-carriers with impairment problems;

FIG. 9 represents a second example of mapping of symbols of mobile stations on sub-carriers according to the present invention;

FIG. 11 represents a fourth example of mapping of symbols of first and second mobile stations on sub-carriers according to a variant of the present invention;

DETAILED DESCRIPTION OF THE INVENTION

FIG. 1 have already been disclosed, they will be not be described any more.

Figure 2:
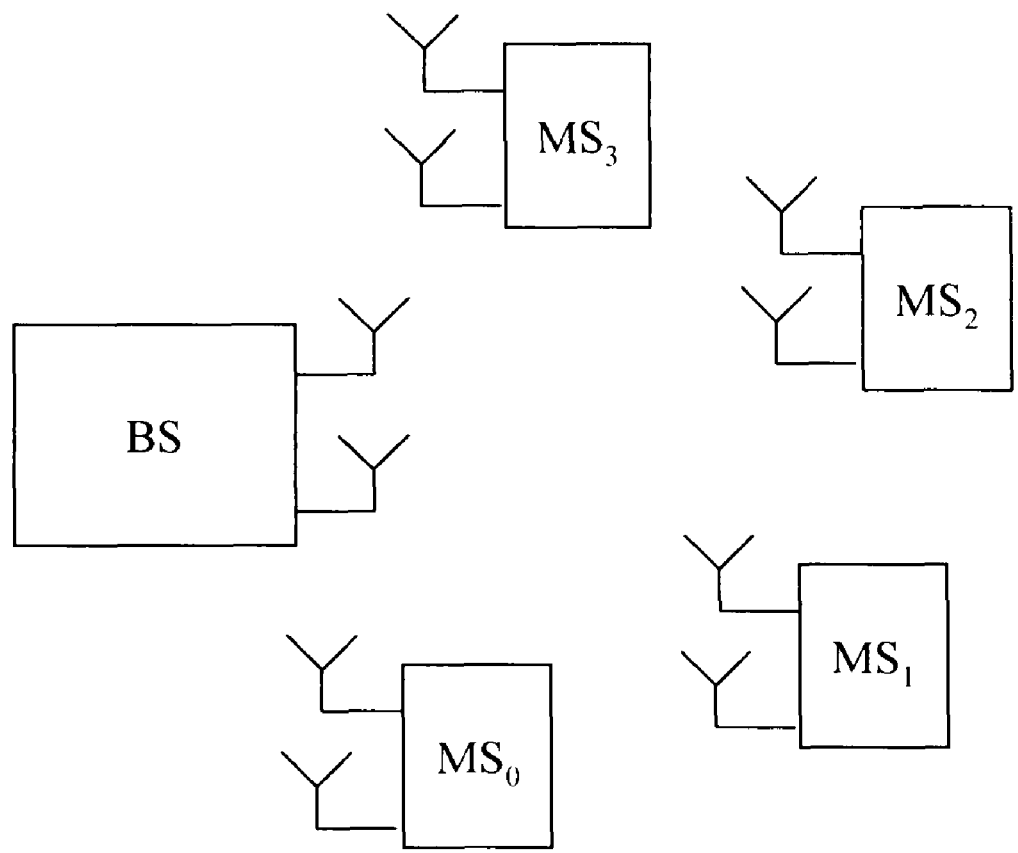
FIG. 2 represents a wireless cellular telecommunication network in which the present invention is implemented.

FIG. 2 represents a wireless cellular telecommunication network in which the present invention is implemented.

The present invention will be described in an example wherein the telecommunication system is a wireless cellular telecommunication system.

The present invention is also applicable to wireless or wired telecommunication systems like Local Area Networks.

In FIG. 2, one base station BS of a wireless cellular telecommunication network and four mobile stations $MS_0$, $MS_1$, $MS_2$, and $MS_3$ are shown.

The base station BS is a base station of a wireless cellular telecommunication network comprising plural base stations.

According to the invention, the base station BS determines, for each mobile station MS located in the cell of the base station BS, the frequency band through which each mobile station MS has to transfer data.

More precisely, the base station BS determines, for each mobile station MS the base station BS is in charge, the sub-carriers on which the mobile station MS maps data.

According to the invention, the base station BS determines, for each mobile station $MS_i$, with i=0 to 3, the base station BS is in charge, the shifting parameter $p_i$ the mobile station has to use in order to enable the decoding, by the base station BS of the symbols transferred simultaneously by the mobile stations MS on overlapping frequency bands.

According to the invention, the base station BS transfers to each mobile station MS, information representative of the frequency band allocated to the mobile station MS and may transfer information representative of the shifting parameter determined for the mobile station MS.

According to the invention, each mobile station MS maps data on sub-carriers allocated to it according to the shifting parameter determined by the base station BS for the mobile station MS.

Figure 3:
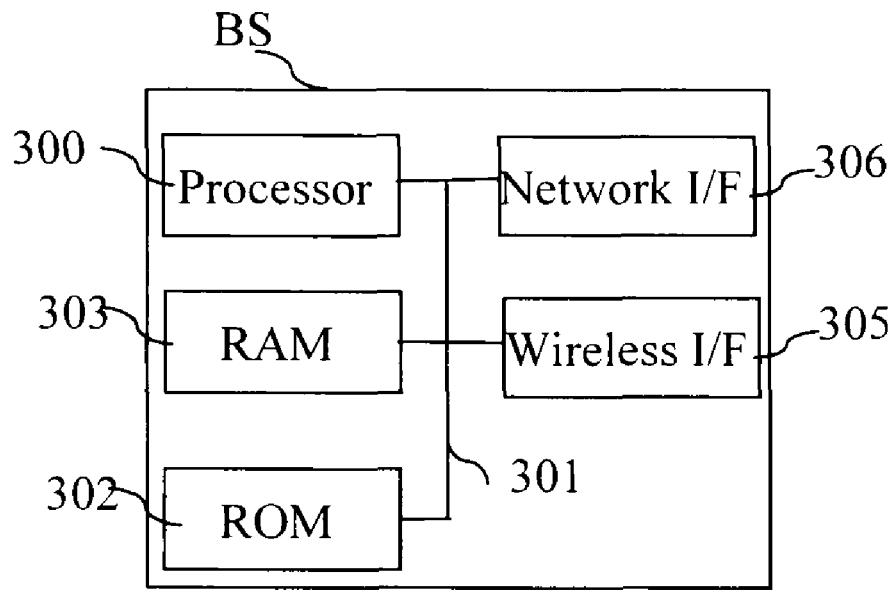
FIG. 3 is a diagram representing the architecture of a base station in which the present invention is implemented.

FIG. 3 is a diagram representing the architecture of a base station in which the present invention is implemented.

Figure 13:
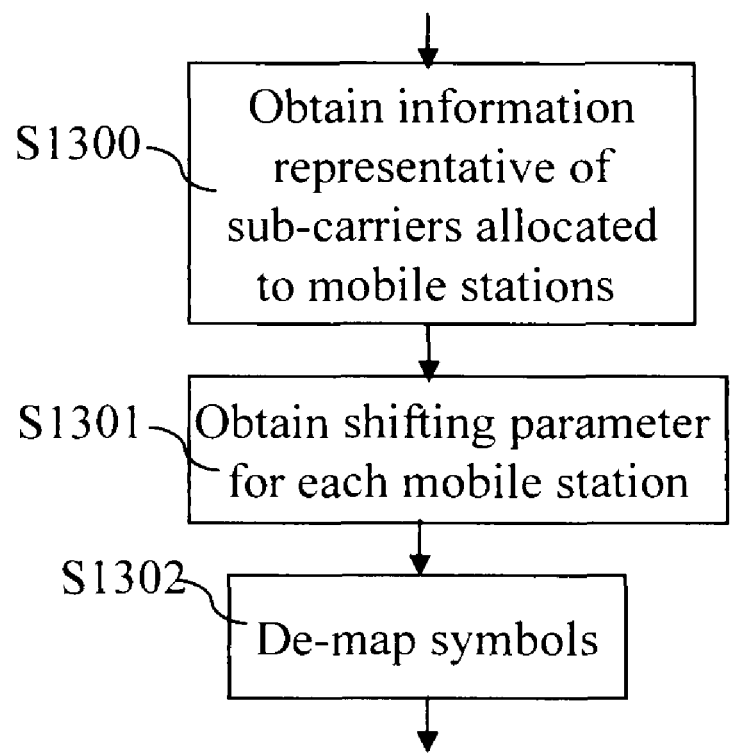
FIG. 13 discloses an example of an algorithm executed by the base station when the base station receives symbols from plural mobile stations according to the present invention.

The base station BS has, for example, an architecture based on components connected together by a bus 301 and a processor 300 controlled by the program as disclosed in FIGS. 7 and 13.

It has to be noted here that the base station BS may have an architecture based on dedicated integrated circuits.

The bus 301 links the processor 300 to a read only memory ROM 302, a random access memory RAM 303, a wireless interface 305 and a network interface 306.

The memory 303 contains registers intended to receive variables and the instructions of the program related to the algorithm as disclosed in FIGS. 7 and 13.

The memory 303 may comprise predefined frequency bands to allocate to mobile stations and the corresponding shifting parameters.

The processor 300 controls the operation of the network interface 306 and of the wireless interface 305.

The read only memory 302 contains instructions of the program related to the algorithm as disclosed in FIGS. 7 and 13, which are transferred, when the base station BS is powered on, to the random access memory 303.

The base station BS may be connected to a telecommunication network through the network interface 306. For example, the network interface 306 is a DSL (Digital Subscriber Line) modem, or an ISDN (Integrated Services Digital Network) interface, etc.

The wireless interface 305 comprises means for transferring information representative of the frequency band or sub-carriers allocated to each mobile station MS and information representative of the shifting parameter determined for the mobile station MS and to be used by the mobile station MS for mapping symbols on allocated sub-carriers.

Figure 6:
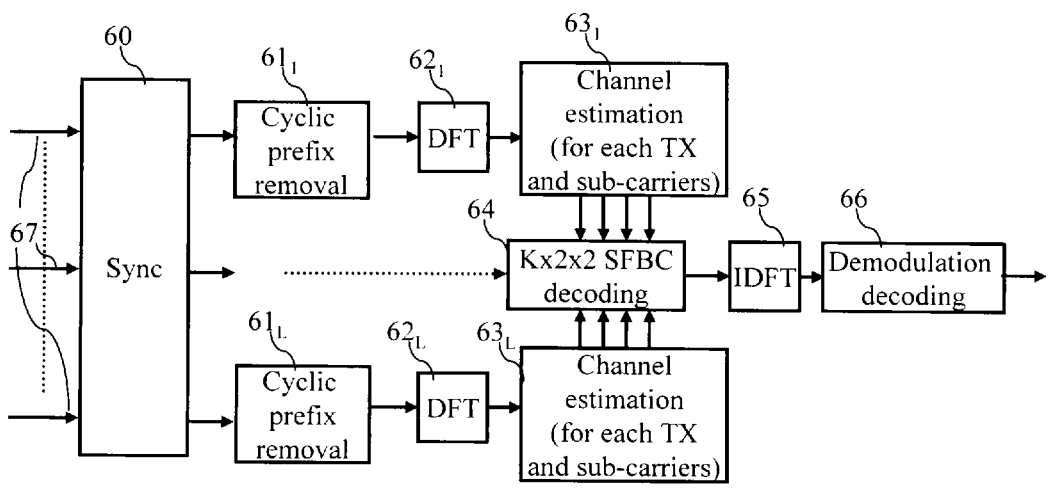
FIG. 6 illustrates the architecture of the decoder of a base station having several receive antennas according to a particular embodiment of the invention.

The wireless interface 305 comprises a decoder as disclosed in the FIG. 6 or as disclosed in the patent application published under the reference WO 2008/098672.

Figure 4:
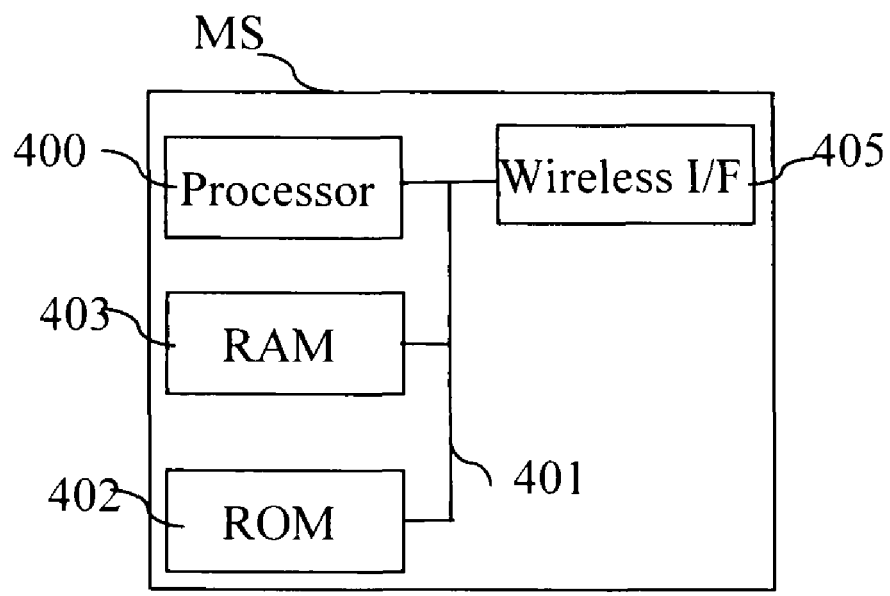
FIG. 4 is a diagram representing the architecture of a mobile station in which the present invention is implemented.

FIG. 4 is a diagram representing the architecture of a mobile station in which the present invention is implemented.

Figure 12:
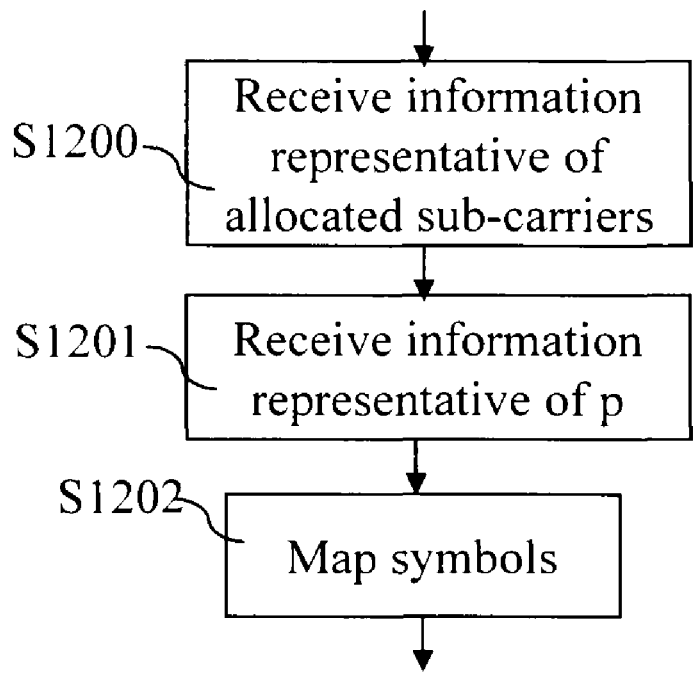
FIG. 12 discloses an example of an algorithm executed by each mobile station according to the present invention.

The mobile station MS has, for example, an architecture based on components connected together by a bus 401 and a processor 400 controlled by the program as disclosed in FIG. 12.

It has to be noted here that the mobile station MS may have an architecture based on dedicated integrated circuits.

The bus 401 links the processor 400 to a read only memory ROM 402, a random access memory RAM 403 and a wireless interface 405.

The memory 403 contains registers intended to receive variables and the instructions of the program related to the algorithm as disclosed in FIG. 12.

The processor 400 controls the operation of the wireless interface 405.

The read only memory 402 contains instructions of the program related to the algorithm as disclosed in FIG. 12, which are transferred, when the mobile station MS is powered on, to the random access memory 403.

The wireless interface 405 comprises means for mapping data on sub-carriers comprised in the frequency allocated to the mobile station MS according to the shifting parameter determined for the mobile station MS.

Figure 5:
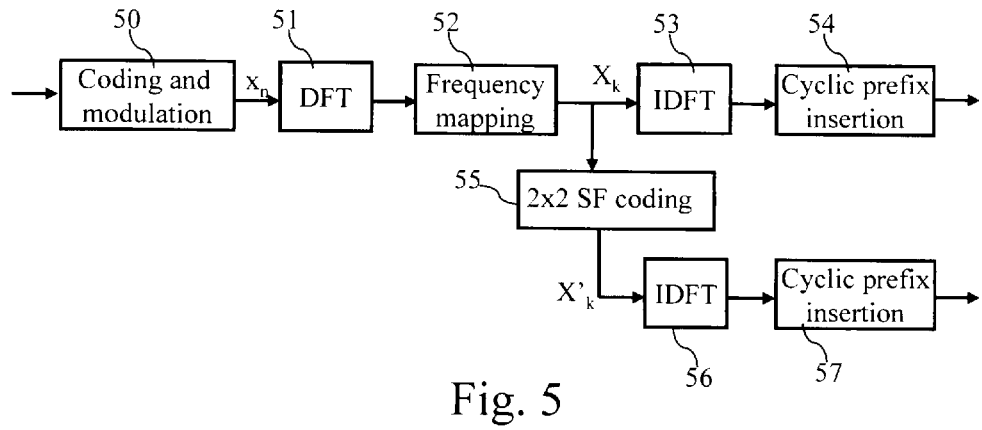
FIG. 5 illustrates the architecture of the encoder comprised in a mobile station according to a particular embodiment of the invention in frequency domain.

The wireless interface 405 comprises an encoder as disclosed in the FIG. 5 or as disclosed in the patent application published under the reference WO 2008/098672.

FIG. 5 illustrates the architecture of the encoder comprised in a mobile station according to a particular embodiment of the invention in frequency domain.

Data to be transmitted are coded and organized as symbols by the coding and modulation module 50 giving a set of symbols $x_n$. Then the signal is spread in the frequency domain by the DFT (Discrete Fourier Transform) module 51. In a variant, the DFT module is replaced by a Fast Fourier Transform module or any other processing module.

In case of OFDMA, DFT module may not be needed.

The symbols spread in the frequency domain are mapped on sub-carriers comprised in the allocated frequency band by a frequency mapping module 52 which maps data to be transferred on sub-carriers The frequency mapping module 52 may comprise zeros insertion and/or frequency shaping capabilities. The symbols Xk outputted by the frequency mapping module 52 are transformed back in the time domain by the IDFT (Inverse Discrete Fourier Transform) module 53.

An optional cyclic prefix insertion module 54 can be applied before transmission through a first antenna, for example the antenna Ant11 of the mobile station $MS_1$.

A second antenna, for example the antenna Ant 12 of the mobile station MS1, is fed by data computed by the space frequency block code computation module 55 according to the shifting parameter $p_1$ determined for the mobile station $MS_1$, leading to a new branch having IDFT module 56 and an optional cyclic prefix insertion module 57 as the IDFT module 53 and cyclic prefix insertion module 54.

FIG. 6 illustrates the architecture of the decoder of a base station having several receive antennas according to a particular embodiment of the invention.

Several signals 67 are received from the receive antennas. The synchronization module 60 synchronizes all these received signals 67.

The optional cyclic prefix removal modules $61_l$ to $61_L$, remove the cyclic prefix if used, in parallel to all the synchronized signals.

The DFT modules $62_l$ to $62_L$ execute a DFT on the synchronized signals on which the cyclic prefix has been removed or not. In a variant, the DFT module is replaced by a Fast Fourier Transform module or any other processing module.

In case of OFDMA, DFT module may not be needed.

L modules, possibly one complex module, of channel estimation $63_l$ to $63_L$ will work on the L signals and feeding one decoder module 64 comprising a L by two by two elementary space frequency block decoder serially processing the pairs of sub-carriers. An inverse DFT module 65 before a classical channel decoding module 66 treats the resulting signal.

Figure 7A:
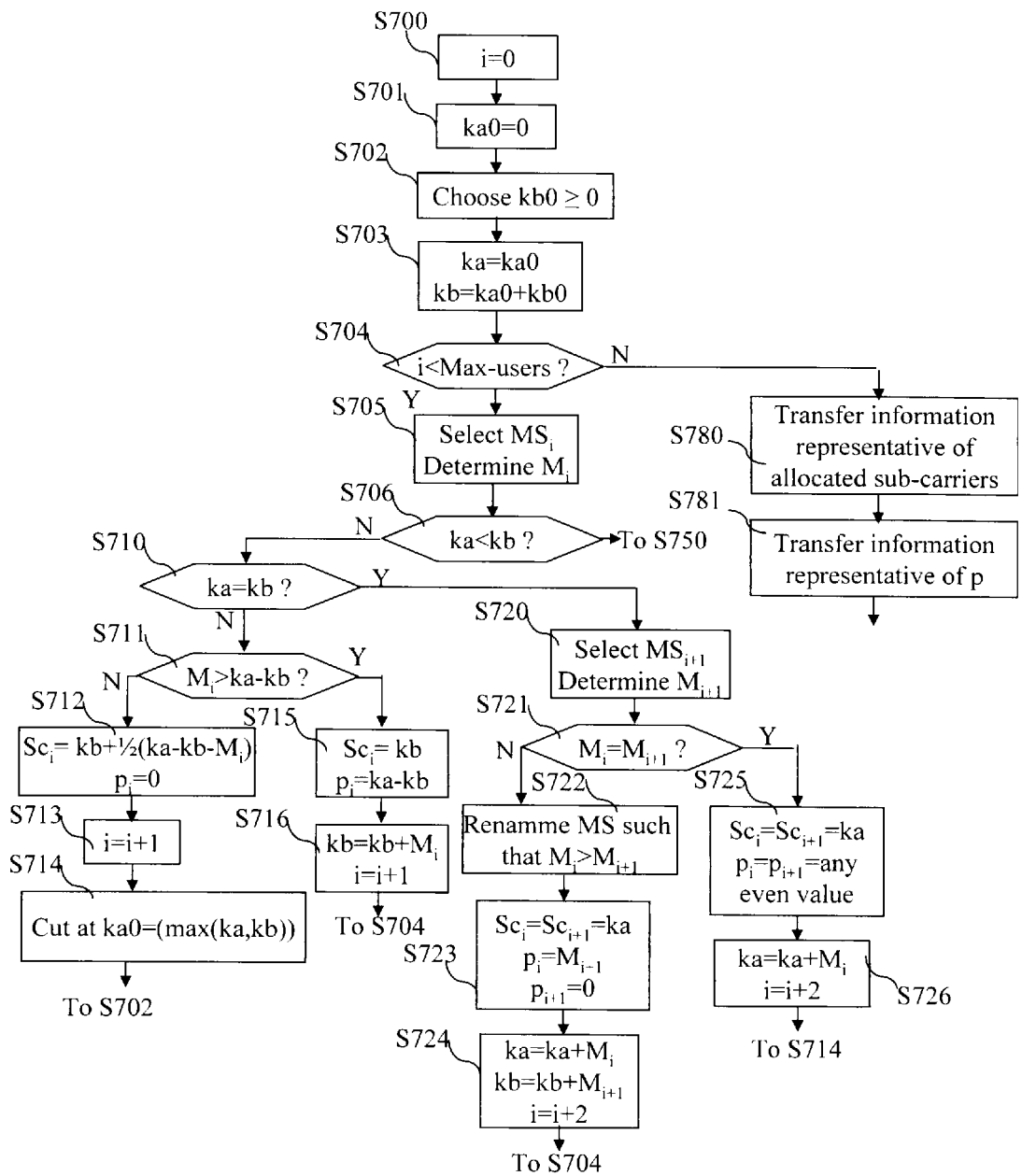
FIGS. 7a and 7b disclose an example of an algorithm executed by a base station according to the present invention.
Figure 7B:
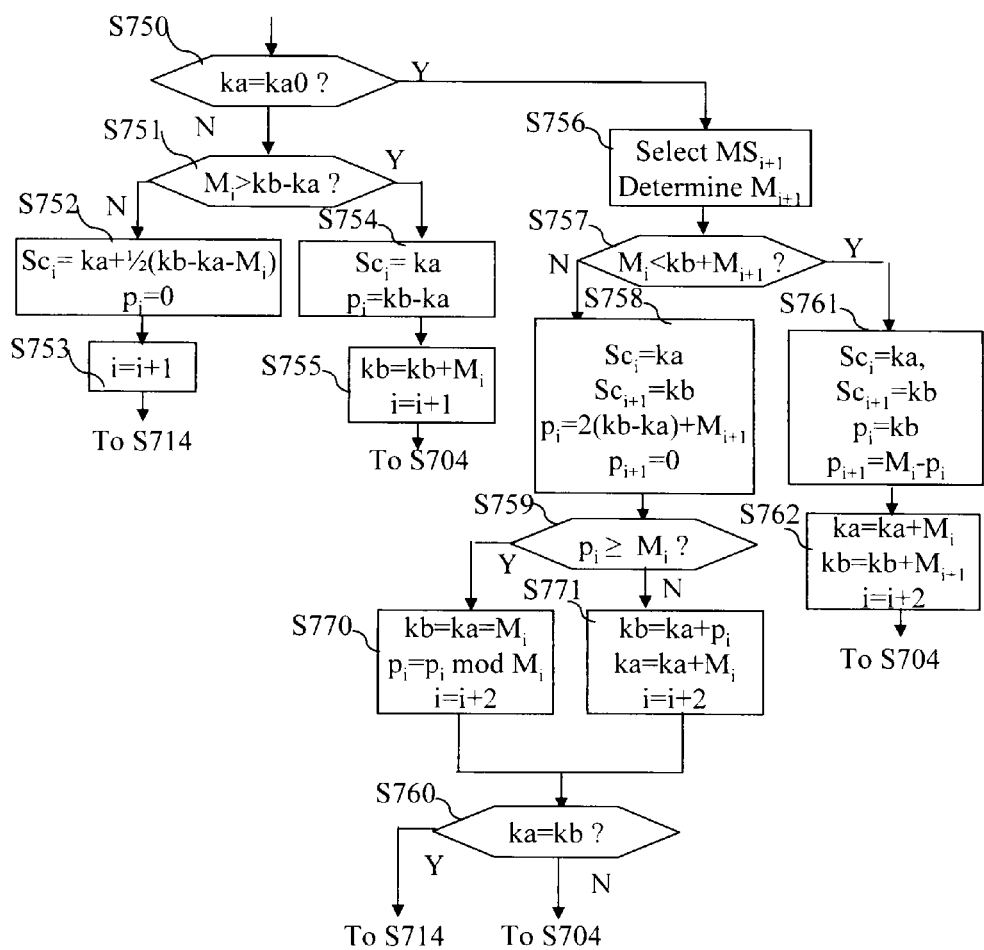

FIGS. 7a and 7b disclose an example of an algorithm executed by a base station according to the present invention.

More precisely, the present algorithm is executed by the processor 300 of the base station BS.

The present algorithm is executed each time sub-carriers have to be allocated to mobile stations MS.

At step S700, the processor 300 sets the variable i to the null value. The variable i is an index indicating for which mobile station $MS_i$ the present algorithm is executing.

At next step S701, the processor 300 sets the variable ka0 to null value.

At next step S702, the processor 300 selects a value of the variable kb0 to a value equal or upper than null value.

For example, the value of variable kb0 is selected to be equal to null value.

At next step S703, the processor 300 sets the variable ka to the value ka0 and sets the variable kb to the sum of variables ka0 and kb0.

At next step S704, the processor 300 checks if the variable i is lower than the number Max-users of mobile stations MS the base station BS is in charge.

According to the example of the FIG. 2, Max-users equals four.

If the variable i is lower than the number Max-users of mobile stations MS the base station BS is in charge or handles, the processor 300 moves to step S705. Otherwise, the processor 300 moves to step S780.

At step S705, the processor 300 selects the mobile station $MS_i$ and determines the even number of sub-carriers $M_i$ to be allocated to the mobile station $MS_i$.

For example, the processor 300 determines that eight sub-carriers are allocated to the mobile station $MS_0$.

At next step S706, the processor 300 checks if ka is strictly lower than kb.

If ka is strictly lower than kb, the processor 300 moves to step S750 of the algorithm of the FIG. 7b.

If ka is not strictly lower than kb, the processor 300 moves to step S710.

At step S710, the processor 300 checks if ka equals kb.

If ka equals kb, the processor 300 moves to step S720. Otherwise, the processor 300 moves to step S711.

As ka=kb=0, the processor 300 moves to step S720.

At step S720, the processor 300 selects the mobile station $MS_{i+1}$ and determines the even number of sub-carriers $M_{i+1}$ to be allocated to the mobile station $MS_{i+1}$.

For example, the processor 300 determines that twelve sub-carriers are allocated to the mobile station $MS_1$.

At next step S721, the processor 300 checks if $M_i$ is equal to $M_{i+1}$.

If $M_i$ is equal to $M_{i+1}$, the processor 300 moves to step S725. Otherwise, the processor S722.

At step S725, the processor 300 sets the value of the variables $Sc_i$ and $Sc_{i+1}$ to the value of ka and sets the shifting parameters $p_i$ and $p_{i+1}$ to be used by the mobile stations $MS_i$ and $MS_{i+1}$ to any even value comprised between 0 and $M_i$−1.

The variables $Sc_i$ and $Sc_{i+1}$ are the index of the first sub-carriers allocated to the mobile stations $MS_i$ and $MS_{i+1}$.

At next step S726, the processor 300 sets the variable ka to the sum of ka and $M_i$ and increments the variable i by two.

After that, the processor 300 moves to step S714 of the FIG. 7a.

As $M_0$ is different from $M_1$, the processor 300 moves from step S721 to S722.

At step S722, the processor 300 renames, if needed, the mobile stations $MS_i$ and $MS_{i+1}$ in order that $M_i$ is strictly upper than $M_{i+1}$.

As $M_0$ equals eight and $M_1$ equals twelve, the mobile station $MS_0$ is renamed as $MS_1$ and vice-versa and $M_0$ and $M_1$ values are exchanged.

At next step S723, the processor 300 sets the value of the variables $Sc_i$ and $Sc_{i+1}$ to the value of ka, sets the shifting parameter $p_i$ to be used by the mobile station $MS_i$ to $M_{i+1}$ and sets the shifting parameter $p_{i+1}$ to be used by the mobile station $MS_{i+1}$ to the null value.

According to above mentioned example, $Sc_0$ and $Sc_1$ are set to null value, i.e. the subcarrier noted zero is the first sub-carrier allocated to the mobile stations $MS_0$ and $MS_1$. The shifting parameter $p_0$ to be used by the mobile station $MS_0$ is set to eight and the shifting parameter $p_1$ to be used by the mobile station $MS_1$ is set to the null value. Such allocation is disclosed in the FIG. 8.

The shifting parameter $p_0$ is even and at least equal to the number of sub-carriers allocated to the mobile station $MS_1$.

The shifting parameter $p_1$ may be different from the shifting parameter $p_0$.

Figure 8:
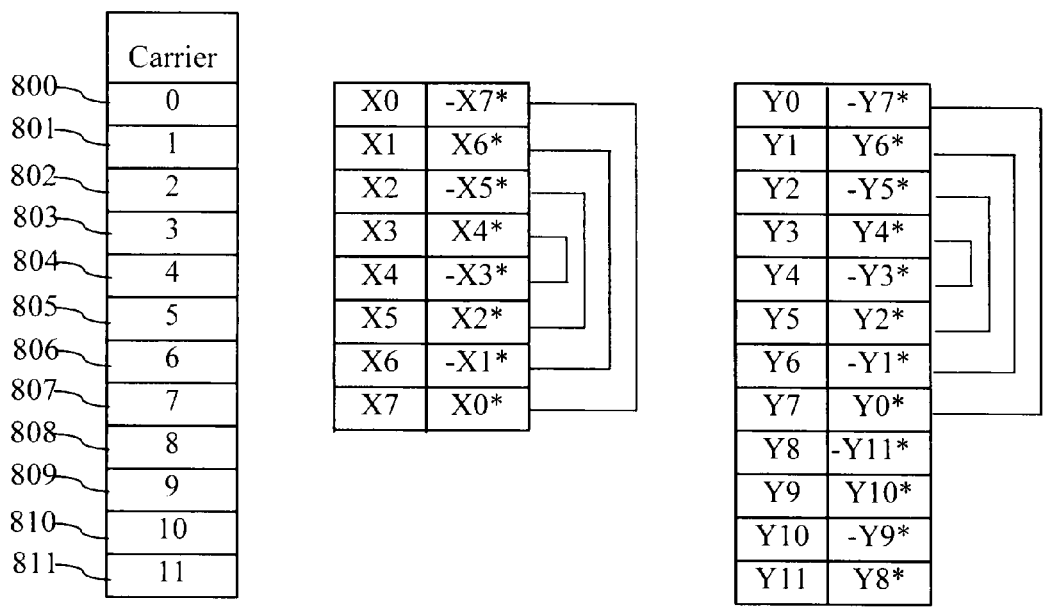
FIG. 8 represents a first example of mapping of symbols of first and second mobile stations on sub-carriers according to the present invention.

FIG. 8 represents a first example of mapping of symbols of first and second mobile stations on sub-carriers according to the present invention.

The frequency band allocated to the mobile station $MS_0$ comprises the sub-carriers noted 0 to 11. The frequency band allocated to the mobile station $MS_1$ comprises the sub-carriers noted 0 to 7.

The mobile station $MS_0$ transfers symbols on the sub-carriers noted 0 to 11. The sub-carriers noted 0 to 11 are the sub-carriers at the input of the frequency mapping module 52 of the FIG. 5. According to the frequency mapping module 52, these subcarriers may be different from the ones provided at the output of the frequency mapping module 52 and thus at the input of the IDFT modules 53 and 56 of the FIG. 5.

The mobile station $MS_1$ transfers symbols on the sub-carriers noted 0 to 7. The sub-carriers noted 0 to 7 are the sub-carriers at the input of the frequency mapping module 52 of the FIG. 5. According to the frequency mapping module 52, these subcarriers may be different from the ones provided at the output of the frequency mapping module 52 and thus at the input of the IDFT modules 53 and 56 of the FIG. 5.

When the first mobile station $MS_0$ and the second mobile station MS, transmit simultaneously data on the frequency bands allocated to them, there is no impairment problem.

The line 800 comprises the sub-carrier 0 on which the couples of data (X0, −X7*) and (Y0, −Y7*) are mapped. The line 807 comprises the sub-carrier 7 on which the couples of data (X7, X0*) and (Y7, Y0*) are mapped. No impairment exists for the sub-carriers 0 and 7.

The line 801 comprises the sub-carrier 1 on which the couples of data (X1, X6*) and (Y1, Y6*) are mapped. The line 806 comprises the sub-carrier 6 on which the couples of data (X6, −X1*) and (Y6, −Y1*) are mapped. No impairment exists for the sub-carriers 1 and 6.

The line 802 comprises the sub-carrier 2 on which the couples of data (X2, −X5*) and (Y2, −Y5*) are mapped. The line 805 comprises the sub-carrier 5 on which the couples of data (X5, X2*) and (Y5, Y2*) are mapped. No impairment exists for the sub-carriers 2 and 5.

The line 803 comprises the sub-carrier 3 on which the couples of data (X3, X4*) and (Y3, Y4*) are mapped. The line 804 comprises the sub-carrier 4 on which the couples of data (X4, −X3*) and (Y4, −Y3*) are mapped. No impairment exists for the sub-carriers 3 and 4.

The line 808 comprises the sub-carrier 8 on which the couple of data (Y8, −Y11*) is mapped. The line 811 comprises the sub-carrier 11 on which the couple of data (Y11, Y8*) is mapped. No impairment exists for the sub-carriers 8 and 11.

The line 809 comprises the sub-carrier 9 on which the couple of data (Y9, Y10*) is mapped. The line 810 comprises the sub-carrier 10 on which the couple of data (Y10, −Y9*) is mapped. No impairment exists for the sub-carriers 9 and 10.

The mobile station $MS_1$ comprises two transmit antennas which transfer $M_1$ equals eight symbols on sub-carriers of the frequency band allocated to the mobile station $MS_1$. The symbols X0 to X7 are transferred through a first antenna. The symbols X0 to X7 are modified according to the following formula by $X'^{secondAnt}_k = (-1)^{k+1} X^*_{(p1-1-k)modM1}$ for k=0 to $M_1-1$ and $p_1=0$ giving the signal to be emitted on the second antenna from the signal X to be emitted on the first antenna.

The lines 800 and 807 are linked as they carry information related to same symbols X0 and X7. The lines 801 and 806 are linked as they carry information related to same symbols X1 and X6. The lines 802 and 805 are linked as they carry information related to same symbols X2 and X5. The lines 803 and 804 are linked as they carry information related to same symbols X3 and X4.

The second mobile station $MS_0$ comprises two transmit antennas which transfer $M_0$ equals twelve symbols on sub-carriers of the frequency band allocated to the mobile station $MS_0$. The symbols Y0 to Y11 are transferred through a first antenna. The symbols Y0 to Y11 are modified according to the following formula by $Y'^{secondAnt}_k = (-1)^{k+1} Y^*_{p0-1-k)modM0}$ for k=0 to $M_0-1$ and $p_0$ equals eight giving the signal to be emitted on the second antenna from the signal Y to be emitted on the first antenna.

The line 800 shows the couple (Y0, −Y7*) to be transmitted on the sub-carrier 0. The line 807 shows the couple (Y7, Y0*) to be transmitted on the sub-carrier 7. The lines 800 and 807 are linked as they carry information related to same symbols.

The lines 801 and 806 are linked as they carry information related to same symbols Y1 and Y6. The lines 802 and 805 are linked as they carry information related to same symbols Y2 and Y5. The lines 803 and 804 are linked as they carry information related to same symbols Y3 and Y4. The lines 808 and 811 are linked as they carry information related to same symbols Y8 and Y11. The lines 809 and 810 are linked as they carry information related to same symbols Y9 and Y10.

At next step S724 of the algorithm of FIG. 7a, the processor 300 sets the value of ka to the sum of ka and $M_1$, sets the value of kb to the sum of kb and $M_{i+1}$ and increments the variable i by two.

The variable ka is then equal to twelve and the variable kb is then equal to eight.

After that, the processor 300 returns to step S704.

At step S704, the processor 300 checks if the variable i is lower than the number Max-users of mobile stations MS the base station BS is in charge.

According to the example of the FIG. 8, Max-users equals two, the processor 300 moves to step S780.

According to the example of the FIG. 2, Max-users equals four.

At step S705, the processor 300 selects the mobile station $MS_i$ and determines the number of sub-carriers $M_i$ to be allocated to the mobile station $MS_i$.

For example, the processor 300 determines that eight sub-carriers are allocated to the mobile station $MS_2$.

At next step S706, the processor 300 checks if ka is strictly lower than kb.

If ka is strictly lower than kb, the processor 300 moves to step S750 of the algorithm of the FIG. 7b.

If ka is not strictly lower than kb, the processor 300 moves to step S710.

As ka equals twelve and kb equals eight, the processor 300 moves to step S710.

At step S710, the processor 300 checks if ka equals kb.

If ka equals kb, the processor 300 moves to step S720. Otherwise, the processor 300 moves to step S711.

As ka equals twelve and kb equals eight, the processor 300 moves to step S711.

At step S711, the processor 300 checks if $M_i$ is strictly upper than ka minus kb.

If $M_i$ is strictly upper than ka minus kb, the processor 300 moves to step S715. Otherwise, the processor 300 moves to step S712.

At step S712, the processor 300 calculates a new variable $Sc_i$ according to the following formula:

$$Sc_i = kb + (ka - kb - M_i)/2.$$

At the same step, the processor 300 sets the variable $p_i$ to null value.

At next step S713, the processor 300 increments the variable i by one.

At next step S714, the processor 300 sets the variable ka0 to the value of maximum value among the variables ka and kb.

Such operation is equivalent at cutting the frequency band and the sub-carrier which is equal to maximum value among the variables ka and kb.

After that, the processor 300 returns to step S702.

As $M_2$ equals eight and ka minus kb equals four, the processor 300 moves to step S715.

At step S715, the processor 300 sets the variable $Sc_i$ to the value of the variable kb. At the same step, the processor 300 sets the variable pi to ka minus kb.

At next step S716, the processor sets the variable kb to the sum of ka and $M_i$. At the same step, the processor 300 increments the variable i by one.

According to the example of FIG. 9, $Sc_2$ is set to eight, i.e. the subcarrier noted eight is the first sub-carrier allocated to the mobile station $MS_2$. The shifting parameter $p_2$ to be used by the mobile station $MS_2$ is set to four, kb is set to sixteen and i=3. Such allocation is disclosed in the FIG. 9.

FIG. 9 represents a second example of mapping of symbols of mobile stations on sub-carriers according to the present invention.

The lines 900 to 907 are identical to the lines 800 to 807.

The frequency band allocated to the mobile station $MS_2$ comprises the sub-carriers noted 8 to 15. The frequency band allocated to the mobile station $MS_0$ comprises the sub-carriers noted 0 to 11.

The mobile station $MS_0$ transfers symbols on the sub-carriers noted 0 to 11. The sub-carriers noted 0 to 11 are the sub-carriers at the input of the frequency mapping module 52 of the FIG. 5. According to the frequency mapping module 52, these subcarriers may be different from the ones provided at the output of the frequency mapping module 52 and thus at the input of the IDFT modules 53 and 56 of the FIG. 5.

The mobile station $MS_2$ transfers symbols on the sub-carriers noted 8 to 15. The sub-carriers noted 8 to 15 are the sub-carriers at the input of the frequency mapping module 52 of the FIG. 5. According to the frequency mapping module 52, these subcarriers may be different from the ones provided at the output of the frequency mapping module 52 and thus at the input of the IDFT modules 53 and 56 of the FIG. 5.

When the mobile station $MS_0$, the mobile station $MS_1$ and the mobile station $MS_2$ transmit simultaneously data on the frequency bands allocated to them, there is no impairment problem.

The line 908 comprises the sub-carrier 8 on which the couples of data (Z0, −Z3*) and (Y8, −Y11*) are mapped. The line 911 comprises the sub-carrier 11 on which the couples of data (Z3, X0*) and (Y11, Y8*) are mapped. No impairment exists for the sub-carriers 8 and 11.

The line 909 comprises the sub-carrier 9 on which the couples of data (Z1, Z2*) and (Y9, Y10*) are mapped. The line 910 comprises the sub-carrier 10 on which the couples of data (Z2, −Z1*) and (Y10, −Y9*) are mapped. No impairment exists for the sub-carriers 9 and 10.

The line 912 comprises the sub-carrier 12 on which the couple of data (Z4, −Z7*) is mapped. The line 915 comprises the sub-carrier 15 on which the couple of data (Z7, Z4*) is mapped. No impairment exists for the sub-carriers 12 and 15.

The line 913 comprises the sub-carrier 13 on which the couple of data (Z5, Z6*) is mapped. The line 914 comprises the sub-carrier 14 on which the couple of data (Z6, −Z5*) is mapped. No impairment exists for the sub-carriers 13 and 14.

The mobile station $MS_2$ comprises two transmit antennas which transfer $M_2$ equals eight symbols on sub-carriers of the frequency band allocated to the mobile station $MS_2$. The symbols Z0 to Z7 are transferred through a first antenna. The symbols Z0 to Z7 are modified according to the following formula by $Z'^{secondAnt}_k = (-1)^{k+1} Z^*_{(p2-1-k)modM2}$ for k=0 to $M_2-1$ and $p_2=4$ giving the signal to be emitted on the second antenna from the signal Z to be emitted on the first antenna.

Once the step S716 is executed, the processor 300 returns to step S704.

At step S704, the processor 300 checks if the variable i is lower than the number Max-users of mobile stations MS the base station BS is in charge.

According to the example of the FIG. 2, Max-users equals four.

At step S705, the processor 300 selects the mobile station $MS_i$ and determines the number of sub-carriers $M_i$ to be allocated to the mobile station $MS_i$.

For example, the processor 300 determines that four sub-carriers are allocated to the mobile station $MS_3$.

At next step S706, the processor 300 checks if ka is strictly lower than kb.

If ka is strictly lower than kb, the processor 300 moves to step S750 of the algorithm of the FIG. 5b.

If ka is not strictly lower than kb, the processor 300 moves to step S710.

As ka equals twelve and kb equals sixteen, the processor 300 moves to step S750.

At step S750, the processor 300 checks if ka equals ka0.

If ka equals ka0, the processor 300 moves to step S756. Otherwise, the processor 300 moves to step S751.

As ka equals twelve the processor 300 moves to step S751.

At step S751, the processor 300 checks if $M_i$ is strictly upper than kb minus ka.

If $M_i$ is strictly upper than kb minus ka, the processor 300 moves to step S754. Otherwise, the processor 300 moves to step S752.

At step S754, the processor 300 sets the variable Sc, to the value of the variable ka. At the same step, the processor 300 sets the variable pi to kb minus ka.

At next step S755, the processor sets the variable kb to the sum of kb and $M_i$. At the same step, the processor 300 increments the variable i by one.

After that, the processor 300 returns to step S704.

As $M_3$ equals four and ka minus kb equals four, the processor 300 moves from step S751 to step S752.

At step S752, the processor 300 calculates a new variable $Sc_i$ according to the following formula:

$$Sc_i = ka + (kb - ka - M_i)/2.$$

At the same step, the processor 300 sets the variable $p_i$ to null value.

According to the example of FIG. 9, $Sc_3$ is set to twelve, i.e. the subcarrier noted twelve is the first sub-carrier allocated to the mobile station $MS_3$. The shifting parameter $p_3$ to be used by the mobile station $MS_3$ is set to null.

At next step S753, the processor 300 increments the variable i by one.

The frequency band allocated to the mobile station $MS_3$ comprises the sub-carriers noted 12 to 15. The frequency band allocated to the mobile station MS, comprises the sub-carriers noted 8 to 15.

When the mobile station $MS_0$, the mobile station $MS_1$, the mobile station $MS_2$ and the mobile station $MS_3$ transmit simultaneously data on the frequency bands allocated to them, there is no impairment problem.

The line 912 comprises the sub-carrier 12 on which the couples of data (Z4, −Z7*) and (T0, −T3*) are mapped. The line 915 comprises the sub-carrier 15 on which the couples of data (Z7, Z4*) and (T3, T0*) are mapped. No impairment exists for the sub-carriers 12 and 15.

The line 913 comprises the sub-carrier 13 on which the couples of data (Z5, Z6*) and (T1,T2*) are mapped. The line 914 comprises the sub-carrier 14 on which the couples of data (Z6, −Z5*) and (T2, −T1*) are mapped. No impairment exists for the sub-carriers 13 and 14.

The mobile station $MS_3$ comprises two transmit antennas which transfer $M_3$ equals four symbols on sub-carriers of the frequency band allocated to the mobile station $MS_3$. The symbols T0 to T3 are transferred through a first antenna. The symbols T0 to T3 are modified according to the following formula by $T'^{secondAnt}_k = (-1)^{k+1} T^*_{p3-1-k)modM3}$ for k=0 to $M_3-1$ and $p_3=0$ giving the signal to be emitted on the second antenna from the signal T to be emitted on the first antenna.

After that, the processor 300 returns to step S714 and returns to S702.

The processor 300 executes the steps S702 to S704 and moves to step S780.

At next step S780, the processor 300 commands the transfer to each mobile station MS of information representative of the sub-carriers allocated to the mobile station MS.

At next step S781, the processor 300 commands the transfer to at least one mobile station MS of information representative of the determined shifting parameter p determined for the mobile station MS.

If each sub-carrier allocated to a mobile station MS is also allocated to another mobile station MS and the number of allocated sub-carriers to the mobile station is twice lower than the number of sub-carriers allocated to the other mobile station MS, a single information, like a bit value equal to one, is transferred to the other mobile station indicating that the other mobile station MS has to use a non null shifting parameter which is equal to half the number of sub-carriers allocated to the mobile station.

For example a bit value equal to one is transferred to the mobile station $MS_0$ indicating that the mobile station $MS_0$ has to use a non null shifting parameter which is equal to half the number of sub-carriers allocated to the mobile station $MS_1$.

In a variant, a single information, like a bit value equal to zero, is transferred to the mobile station indicating that the mobile station MS has to use a null value shifting parameter.

For example a bit value equal to null is transferred to the mobile station $MS_1$ indicating that the mobile station MS, has to use a non null shifting parameter.

If each sub-carrier allocated to a mobile station MS is also allocated to another mobile station MS and the number of allocated sub-carriers to the mobile station is lower than the number of sub-carriers allocated to the other mobile station MS, a single information is transferred to the other mobile station indicating the value of the shifting parameter to be used by the other mobile station.

After that, the processor 300 interrupts the present algorithm.

If we consider another example wherein two mobile stations $MS_0$ and $MS_1$ are handled by the base station BS and kb0 is selected as being equal to two at step S702, ka is equal to null value and kb is equal to two at step S704.

The processor 300 selects at step S705 the mobile station MS0 and determines for example M0 as equal to eight.

As ka is lower than kb, the processor 300 moves from step S706 to step S750.

At step S750, the processor 300 checks if ka equals ka0.

If ka equals ka0, the processor 300 moves to step S756. Otherwise, the processor 300 moves to step S751.

As ka equals null value and kb equals two, the processor 300 moves to step S756.

At step S756, the processor 300 selects the mobile station $MS_{i+1}$ and determines the number of sub-carriers $M_i$ to be allocated to the mobile station $MS_{i+1}$.

For example, the processor 300 determines that eight sub-carriers are allocated to the mobile station $MS_1$.

At next step S757, the processor 300 checks if $M_i$ is lower than the sum of kb and $M_{i+1}$.

If $M_i$ is lower than the sum of kb and $M_{i+1}$, the processor 300 moves to step S761. Otherwise, the processor 300 moves to step S758.

At step S758, the processor 300 sets the value of the variables $Sc_i$ to the value of ka, $Sc_{i+1}$ to the value of kb and sets the shifting parameters $p_i$ as equal to $p_i=2(kb-ka)+M_{i+1}$ and $p_{i+1}$ to null value.

At next step S759, the processor 300 checks if $p_i$, is equal or upper than $M_i$.

If $p_i$, is equal or upper than $M_i$, the processor 300 moves to step S770. Otherwise, the processor 300 moves to step S771.

At step S770, the processor 300 sets the variables ka and kb to $M_i$, sets $p_i$ to $p_i$ modulo $M_i$, and increments the variable i by two.

After that the processor 300 moves to step S760.

At step S771, the processor 300 sets the variable kb to the sum of ka and $p_i$, sets the variable ka to the sum of ka and $M_i$, and increments the variable i by two.

After that the processor 300 moves to step S760.

At step S760, the processor 300 checks if ka is equal to kb.

If ka is equal to kb, the processor 300 moves to step S714. Otherwise, the processor 300 moves to step S704.

As $M_0$ is lower than the sum of kb and $M_1$, the processor 300 moves from step S757 to S761.

At step S761, the processor 300 sets the value of the variables $Sc_i$ the value of ka, $Sc_{i+1}$ to the value of kb, sets the shifting parameter $p_i$ to be used by the mobile station $MS_i$ to kb and sets the shifting parameter $p_{i+1}$ to be used by the mobile station $MS_{i+1}$ to the value $M_i$ minus $p_i$.

According to above mentioned example, $Sc_0$ is set to null value, $Sc_1$ is set to two. The shifting parameter $p_0$ to be used by the mobile station $MS_0$ is set to two and the shifting parameter $p_1$ to be used by the mobile station $MS_1$ is set to the value six. Such allocation is disclosed in the FIG. 10.

After that, the processor 300 returns to step S704.

Figure 10:
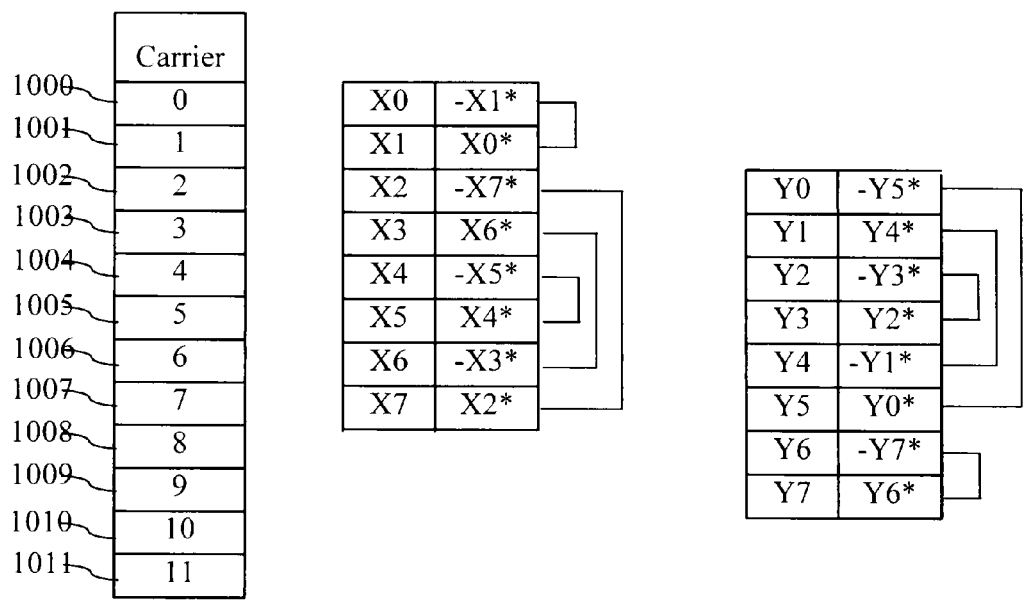
FIG. 10 represents a third example of mapping of symbols of first and second mobile stations on sub-carriers according to the present invention.

FIG. 10 represents a third example of mapping of symbols of first and second mobile stations on sub-carriers according to the present invention.

The frequency band allocated to the mobile station $MS_0$ comprises the sub-carriers noted 0 to 7. The frequency band allocated to the mobile station $MS_1$ comprises the sub-carriers noted 2 to 9.

The mobile station $MS_0$ transfers symbols on the sub-carriers noted 0 to 7. The sub-carriers noted 0 to 7 are the sub-carriers at the input of the frequency mapping module 52 of the FIG. 5. According to the frequency mapping module 52, these subcarriers may be different from the ones provided at the output of the frequency mapping module 52 and thus at the input of the IDFT modules 53 and 56 of the FIG. 5.

The mobile station $MS_1$ transfers symbols on the sub-carriers noted 2 to 9. The sub-carriers noted 2 to 9 are the sub-carriers at the input of the frequency mapping module 52 of the FIG. 5. According to the frequency mapping module 52, these subcarriers may be different from the ones provided at the output of the frequency mapping module 52 and thus at the input of the IDFT modules 53 and 56 of the FIG. 5.

When the first mobile station $MS_0$ and the second mobile station $MS_1$ transmit simultaneously data on the frequency bands allocated to them, there is no impairment problem.

The line 1000 comprises the sub-carrier 0 on which the couple of data (X0, −X1*) is mapped. The line 1001 comprises the sub-carrier 1 on which the couple of data (X1, X0*) is mapped. No impairment exists for the sub-carriers 0 and 1.

The line 1002 comprises the sub-carrier 2 on which the couples of data (X2, −X7*) and (Y0, −Y5*) are mapped. The line 1007 comprises the sub-carrier 7 on which the couples of data (X7, X2*) and (Y5, Y0*) are mapped. No impairment exists for the sub-carriers 2 and 7.

The line 1003 comprises the sub-carrier 3 on which the couples of data (X3, −X5*) and (Y1, Y4*) are mapped. The line 1006 comprises the sub-carrier 6 on which the couples of data (X6, −X3*) and (Y4, −Y1*) are mapped. No impairment exists for the sub-carriers 3 and 6.

The line 1004 comprises the sub-carrier 4 on which the couples of data (X4, −X5*) and (Y2, −Y3*) are mapped. The line 1005 comprises the sub-carrier 5 on which the couples of data (X5, X4*) and (Y3, Y2*) are mapped. No impairment exists for the sub-carriers 4 and 5.

The line 1008 comprises the sub-carrier 8 on which the couple of data (Y6, −Y7*) is mapped. The line 1009 comprises the sub-carrier 9 on which the couple of data (Y7, Y6*) is mapped. No impairment exists for the sub-carriers 8 and 9.

The mobile station $MS_1$ comprises two transmit antennas which transfer $M_1$ equals eight symbols on sub-carriers of the frequency band allocated to the mobile station $MS_1$. The symbols X0 to X7 are transferred through a first antenna. The symbols X0 to X7 are modified according to the following formula by $X^{secondAnt}_k = (-1)^{k+1} X^*_{(p1-1-k) mod M1}$ for k32 0 to $M_1-1$ and $p_1=2$ giving the signal to be emitted on the second antenna from the signal X to be emitted on the first antenna.

The lines 1000 and 1001 are linked as they carry information related to same symbols X0 and X1. The lines 1002 and 1007 are linked as they carry information related to same symbols X2 and X7. The lines 1003 and 1006 are linked as they carry information related to same symbols X3 and X6. The lines 1004 and 1005 are linked as they carry information related to same symbols X4 and X5.

The second mobile station $MS_0$ comprises two transmit antennas which transfer $M_0$ equals twelve symbols on sub-carriers of the frequency band allocated to the mobile station $MS_0$. The symbols Y0 to Y11 are transferred through a first antenna. The symbols Y0 to Y11 are modified according to the following formula by $Y^{secondAnt}_k = (-1)^{k+1} Y^*_{(p0-1-k) mod M0}$ for k=0 to $M_0-1$ and $p_0$ equals 6 giving the signal to be emitted on the second antenna from the signal Y to be emitted on the first antenna.

The line 1000 shows the couple (Y0, −Y5*) to be transmitted on the sub-carrier 0. The line 1007 shows the couple (Y5, Y0*) to be transmitted on the sub-carrier 7. The lines 1000 and 1007 are linked as they carry information related to same symbols.

The lines 1001 and 1006 are linked as they carry information related to same symbols Y1 and Y4. The lines 1002 and 1003 are linked as they carry information related to same symbols Y3 and Y2. The lines 1008 and 1009 are linked as they carry information related to same symbols Y6 and Y7.

FIG. 11 represents a fourth example of mapping of symbols of first and second mobile stations on sub-carriers according to a variant of the present invention.

According to that variant, the processor 300 sets at steps S701 and S702 ka equal to null value and kb to one.

Four sub-carriers are allocated to the mobile stations $MS_1$ and twelve sub-carriers are allocated to the mobile station $MS_0$.

The mobile station $MS_0$ transfers symbols on the sub-carriers noted 0 to 11. The sub-carriers noted 0 to 11 are the sub-carriers at the input of the frequency mapping module 52 of the FIG. 5. According to the frequency mapping module 52, these subcarriers may be different from the ones provided at the output of the frequency mapping module 52 and thus at the input of the IDFT modules 53 and 56 of the FIG. 5.

The mobile station $MS_0$ transfers symbols on the sub-carriers noted 1 to 4. The sub-carriers noted 1 to 4 are the sub-carriers at the input of the frequency mapping module 52 of the FIG. 5. According to the frequency mapping module 52, these subcarriers may be different from the ones provided at the output of the frequency mapping module 52 and thus at the input of the IDFT modules 53 and 56 of the FIG. 5.

When the first mobile station $MS_0$ and the second mobile station MS, transmit simultaneously data on the frequency bands allocated to them, there is no impairment problem.

The line 1100 comprises the sub-carrier 0 on which the couple of data (Y0, −Y5*) is mapped. The line 1105 comprises the sub-carrier 5 on which the couple of data (Y5, Y0*) is mapped. No impairment exists for the sub-carriers 0 and 5.

The line 1101 comprises the sub-carrier 1 on which the couples of data (X0, −X3*) and (Y1, Y4*) are mapped. The line 1104 comprises the sub-carrier 4 on which the couples of data (X3, X0*) and (Y4, −Y1*) are mapped. No impairment exists for the sub-carriers 1 and 4.

The line 1102 comprises the sub-carrier 2 on which the couples of data (X1, X2*) and (Y2, −Y3*) are mapped. The line 1103 comprises the sub-carrier 3 on which the couples of data (X2, −X1*) and (Y3, Y2*) are mapped. No impairment exists for the sub-carriers 2 and 3.

The line 1106 comprises the sub-carrier 6 on which the couple of data (Y6, −Y11*) is mapped. The line 1111 comprises the sub-carrier 11 on which the couple of data (Y11, Y6*) is mapped. No impairment exists for the sub-carriers 6 and 11.

The line 1107 comprises the sub-carrier 6 on which the couple of data (Y7, Y10*) is mapped. The line 1110 comprises the sub-carrier 10 on which the couple of data (Y10, −Y7*) is mapped. No impairment exists for the sub-carriers 7 and 10.

The line 1108 comprises the sub-carrier 8 on which the couple of data (Y8, −Y9*) is mapped. The line 1109 comprises the sub-carrier 9 on which the couple of data (Y9, Y8*) is mapped. No impairment exists for the sub-carriers 8 and 9.

The mobile station $MS_1$ comprises two transmit antennas which transfer $M_1$ equals four symbols on sub-carriers of the frequency band allocated to the mobile station $MS_1$. The symbols X0 to X3 are transferred through a first antenna. The symbols X0 to X3 are modified according to the following formula by $X^{secondAnt}_k = (-1)^{k+1} X^*_{(p1-1-k)modM1}$ for k=0 to $M_1$−1 and $p_1$=0 giving the signal to be emitted on the second antenna from the signal X to be emitted on the first antenna.

The lines 1101 and 1104 are linked as they carry information related to same symbols X0 and X3. The lines 1102 and 1103 are linked as they carry information related to same symbols X1 and X2.

The second mobile station $MS_0$ comprises two transmit antennas which transfer $M_0$ equals twelve symbols on sub-carriers of the frequency band allocated to the mobile station $MS_0$. The symbols Y0 to Y11 are transferred through a first antenna. The symbols Y0 to Y11 are modified according to the following formula by $Y^{secondAnt}_k = (-1)^{k+1} Y^*_{(p0-1-k)modM0}$ for k=0 to $M_0$−1 and $p_0$ equals 6 giving the signal to be emitted on the second antenna from the signal Y to be emitted on the first antenna.

The line 1100 shows the couple (Y0, −Y5*) to be transmitted on the same sub-carrier. The line 1105 shows the couple (Y5, Y0*) to be transmitted on the sub-carrier 5. The lines 1100 and 1105 are linked as they carry information related to same symbols.

The lines 1101 and 1104 are linked as they carry information related to same symbols Y1 and Y4. The lines 1102 and 1103 are linked as they carry information related to same symbols Y2 and Y3. The lines 1106 and 1111 are linked as they carry information related to same symbols Y6 and Y11. The lines 1107 and 1110 are linked as they carry information related to same symbols Y7 and Y10. The lines 1108 and 1109 are linked as they carry information related to same symbols Y8 and Y9.

FIG. 12 discloses an example of an algorithm executed by each mobile station according to the present invention.

At step S1200, the mobile station MS receives information representative of the sub-carriers allocated to the mobile station MS.

At next step S1201, the mobile station MS receives information representative of the determined shifting parameter p determined for the mobile station MS. At next step S1202, the symbols to be transferred are mapped on the allocated sub-carriers according to the received shifting parameter and transferred to the base station BS.

FIG. 13 discloses an example of an algorithm executed by the base station when the base station receives symbols from plural mobile stations according to the present invention.

More precisely, the present algorithm is executed by the processor 300 of the base station.

At step S1300, the processor 300 obtains information representative of the sub-carriers allocated to each mobile station MS the base station BS handles.

Information representative of the sub-carriers allocated to each mobile station BS the base station BS handles is as the one determined according to the algorithm disclosed in the FIGS. 7.

At step S1301, the processor 300 obtains information representative of the shifting parameter determined for each mobile station MS the base station BS handles.

Information representative of the shifting parameter determined for each mobile station MS the base station BS handles is as the one determined according to the algorithm disclosed in the FIG. 7.

At next step S1302, the received symbols are de-mapped on the allocated sub-carriers according to the received shifting parameters.

Naturally, many modifications can be made to the embodiments of the invention described above without departing from the scope of the present invention.

The invention claimed is:

1. Method for determining shifting parameters $p_1$ and $p_2$ to be used by a first and a second telecommunication devices for mapping symbols on sub-carriers, the first telecommunication device comprising at least two transmit antennas, the symbols being transferred through each antenna of the first telecommunication device on at least an even number '$M_1$', strictly greater than two, of sub-carriers allocated to the first telecommunication device, the second telecommunication device comprising at least two transmit antennas, the symbols being transferred through each antenna of the second telecommunication device on an even number '$M_2$', equal or greater than $M_1$, of sub-carriers allocated to the second telecommunication device, the first telecommunication device transferring on a first antenna of the first telecommunication device during a time slot on each frequency 'k1', with k1=0 to $M_1-1$, a signal representing a symbol '$X_{k1}$' in the frequency domain, the first telecommunication device transferring on a second antenna of the first telecommunication device during the time slot, on each frequency 'k1', with k1=0 to $M_1-1$ a signal representing a symbol '$X'_{k1}$' derived from the symbol $X_{k1}$, for each frequency k1, by the formula $X'^{secondAnt}_{k1} = \epsilon(-1)^{k1+1} X^*_{(p_1-1-k1) mod M_1}$, where $\epsilon$ is 1 or $-1$, $X^*$ means the complex conjugate of X, $p_1-1-k1$ is taken modulo $M_1$ and p1 even, the second telecommunication device transferring on a first antenna of the second telecommunication device during a given time slot on each frequency 'k2', with k2=0 to $M_2-1$, a signal representing a symbol '$Y_{k2}$' in the frequency domain, the second telecommunication device transferring on a second antenna of the second telecommunication device during the same given time slot, on each frequency 'k2', with k2=0 to $M_2-1$, a signal representing a symbol '$Y'_{k2}$' derived from the symbol $Y_{k2}$, for each frequency k2, by the formula $Y'^{secondAnt}_{k2} = \epsilon(-1)^{k2+1} Y^*_{(p_2-1-k2) mod M_2}$ where $p_2-1k2$ is taken modulo $M_2$ and p2 even, the method comprises the steps of:

allocating to the first and the second telecommunication devices sub-carriers, at least a part of the sub-carriers allocated to the first telecommunication device being also allocated to the second telecommunication device, determining the shifting parameter $p_2$, the shifting parameter $p_2$ being even and at least equal to the number of overlapping sub-carriers allocated to both the first and the second telecommunication devices or the shifting parameter $p_2$ being even and at most equal to $M_2$ minus the number of overlapping sub-carriers allocated to both the first and the second telecommunication devices.

2. Method according to the claim 1, wherein the method comprises further step of determining the shifting parameter $p_1$, the shifting parameter $p_1$ being even and different from the shifting parameter $p_2$.

3. Method according to claim 2, wherein each sub-carrier allocated to the first telecommunication device is also allocated to the second telecommunication device, $M_2$ is strictly upper than $M_1$, $p_1$ is determined as equal to null value and $p_2$ is determined as equal to $M_1$.

4. Method according to the claim 3, wherein $M_2=2M_1$ and the method comprises further step of transferring to the second telecommunication device an information indicating that the second telecommunication device has to use a non null shifting parameter equal to $M_2$ divided by two.

5. Method according to the claim 4, wherein the method comprises further step of transferring to the first telecommunication device an information indicating that the first telecommunication device has to use a null shifting parameter.

6. Method according to the claim 3, wherein the method comprises further step of transferring to the second telecommunication device an information indicating the value of the shifting parameter to be used by the second telecommunication device.

7. Method according to claim 2, wherein each sub-carrier allocated to the first telecommunication device is allocated to the second telecommunication device and the sub-carriers allocated to the second telecommunication device and not allocated to the first telecommunication device surround the sub-carriers allocated to both the first and second telecommunication devices.

8. Method according to claim 1, wherein the method further comprises the step of:

transferring to each telecommunication device information representative of the sub-carriers allocated to the telecommunication device.

9. Method according to claim 8, wherein the method is executed by a base station and further comprises the steps of:

de mapping symbols on sub-carriers allocated to the first telecommunication device using the shifting parameter determined for the first telecommunication device, de mapping symbols on sub-carriers allocated to the second telecommunication device using the shifting parameter determined for the second telecommunication device.

10. Method according to claim 9, wherein the method comprises further step executed by a each telecommunication device of mapping symbols on sub-carriers allocated to the telecommunication device using the shifting parameter determined for the telecommunication device.

11. Device for determining shifting parameters $p_1$ and $p_2$ to be used by a first and a second telecommunication devices for mapping symbols on sub-carriers, the first telecommunication device comprising at least two transmit antennas, the symbols being transferred through each antenna of the first telecommunication device on at least an even number '$M_1$', strictly greater than two, of sub-carriers allocated to the first telecommunication device, the second telecommunication device comprising at least two transmit antennas, the symbols being transferred through each antenna of the second telecommunication device on an even number '$M_2$', equal or greater than $M_1$, of sub-carriers allocated to the second telecommunication device, the first telecommunication device transferring on a first antenna of the first telecommunication device during a time slot on each frequency 'k1', with k1=0 to $M_1-1$, a signal representing a symbol '$X_{k1}$' in the frequency domain, the first telecommunication device transferring on a second antenna of the first telecommunication device during the time slot, on each frequency 'k1', with k1=0 to $M_1-1$, a signal representing a symbol '$X'_{k1}$' derived from the symbol $X_{k1}$, for each frequency k1, by the formula $X'^{secondAnt}_{k1} = \epsilon(-1)^{k1+1} X^*_{(p_1-1-k1) mod M_1}$, where $\epsilon$ is 1 or $-1$, $X^*$ means the complex conjugate of X, $p_1 1-k1$ is taken modulo $M_1$ and $p_1$ is even, the second telecommunication device transferring on a first antenna of the second telecommunication device during a given time slot on each frequency 'k2', with k2=0 to $M_2-1$, a signal representing a symbol '$Y_{k2}$' in the frequency domain, the second telecommunication device transferring on a second antenna of the second telecommunication device during the same given time slot, on each frequency 'k2', with k2=0 to $M_2-1$, a signal representing a symbol '$Y'_{k2}$' derived from the symbol $Y_{k2}$, for each frequency k2, by the formula $Y'^{secondAnt}_{k2} = \epsilon(-1)^{k2+1} Y^*_{(p_2-1-k2) mod M_2}$ where $p_2-1-k2$ is taken modulo $M_2$ and $p_2$ is even, the device for determining shifting parameters comprises:

means for allocating to the first and the second telecommunication devices sub-carriers, at least a part of the sub-carriers allocated to the first telecommunication device being allocated to the second telecommunication device, means for determining the shifting parameter $p_2$, the shifting parameter $p_2$ being even and at least equal to the number of overlapping sub-carriers allocated to both the first and the second telecommunication devices or the shifting parameter $p_2$ being even and at most equal to $M_2$ minus the number of overlapping sub-carriers allocated to both the first and the second telecommunication devices.

12. A computer readable medium storing program instructions or portions of code for implementing the steps of the method according to claim 1, when said program instructions or portions of code are executed by a programmable device.

* * * * *